United States Patent
Zaluski et al.

(12) 
(10) Patent No.: US 6,258,261 B1
(45) Date of Patent: Jul. 10, 2001

(54) HONEYCOMB CELL STRUCTURE FOR FLUID-SOLID REACTOR

(75) Inventors: Marek H. Zaluski; Thomas M. Malloy; Martin J. Moe; Creighton J. Barry, all of Butte, MT (US)

(73) Assignee: MSE Technology Applications, Inc., Butte, MT (US)

( * ) Notice: Subject to any disclaimer, the term of this patent is extended or adjusted under 35 U.S.C. 154(b) by 0 days.

(21) Appl. No.: 09/356,548

(22) Filed: Jul. 19, 1999

Related U.S. Application Data

(60) Provisional application No. 60/098,407, filed on Aug. 31, 1998.

(51) Int. Cl.[7] ............................. C02F 1/00; E02D 5/06; E02D 5/08; E02D 3/00; E02D 3/02
(52) U.S. Cl. ..................... 210/170; 210/747; 405/128
(58) Field of Search ........................... 210/170, 747; 405/128

(56) References Cited

U.S. PATENT DOCUMENTS

| | | | |
|---|---|---|---|
| 4,141,821 | * | 2/1979 | Wolff . |
| 4,409,099 | * | 10/1983 | Wolff . |
| 5,057,227 | * | 10/1991 | Cohen . |
| 5,266,213 | * | 11/1993 | Gillham . |
| 5,362,394 | * | 11/1994 | Blowes et al. . |
| 5,487,622 | | 1/1996 | Cherry et al. . |
| 5,490,743 | * | 2/1996 | Vales . |
| 5,514,279 | * | 5/1996 | Blowes et al. . |
| 5,534,154 | * | 7/1996 | Gillham . |
| 5,624,552 | | 4/1997 | Vales et al. . |
| 5,868,941 | * | 2/1999 | Gillham et al. . |

FOREIGN PATENT DOCUMENTS

2206501 * 1/1989 (GB) .

* cited by examiner

Primary Examiner—Thomas M. Lithgow
(74) Attorney, Agent, or Firm—Ralph F. Crandell

(57) ABSTRACT

A permeable wall for the in situ treatment of groundwater flowing therethrough is formed by a plurality of hexagonal cells removably placed in a frame in watertight relation to the frame and each other. The frame is mounted in a gate between barriers or pilings in the flow path of the groundwater. Each cell is formed by a hexagonal shell of water impermeable material defining a central chamber opening therethrough and containing a permeable water treatment material. Sealing tongues project from a portion of the shell, and sealing grooves are defined in another portion. The tongues on one cell are received in sealing grooves on an adjacent cell when the cells are mounted in the frame. Removable panels are mounted on the frame to prevent water flow when the cells are being inserted or removed. The same construction can be utilized for other fluid-solid reactors.

14 Claims, 5 Drawing Sheets

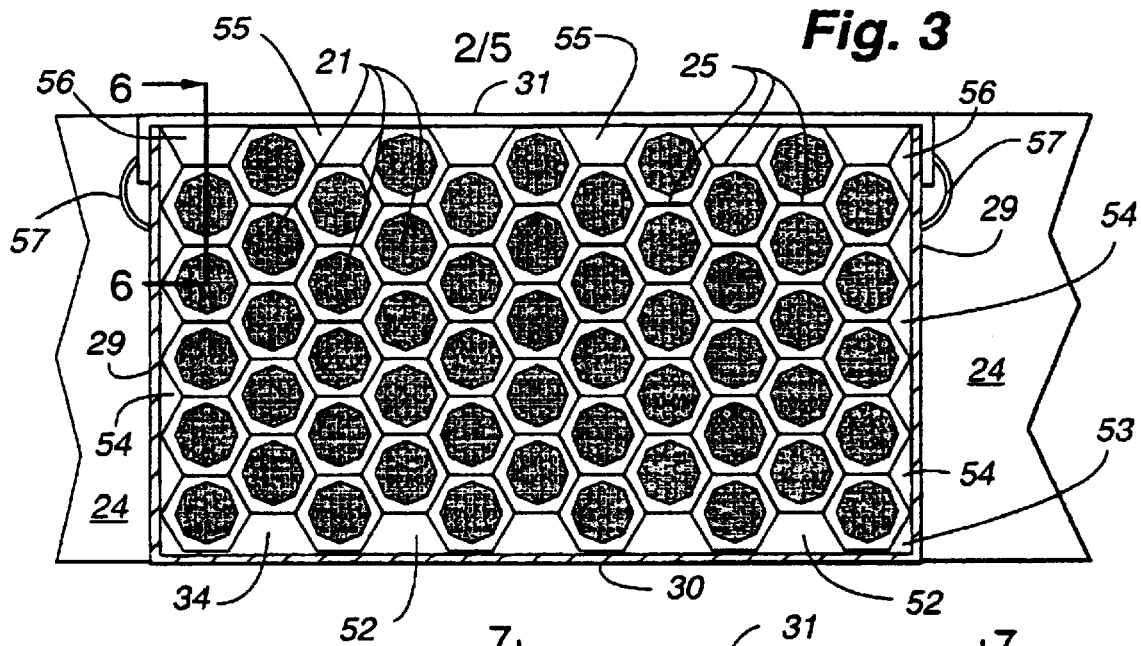
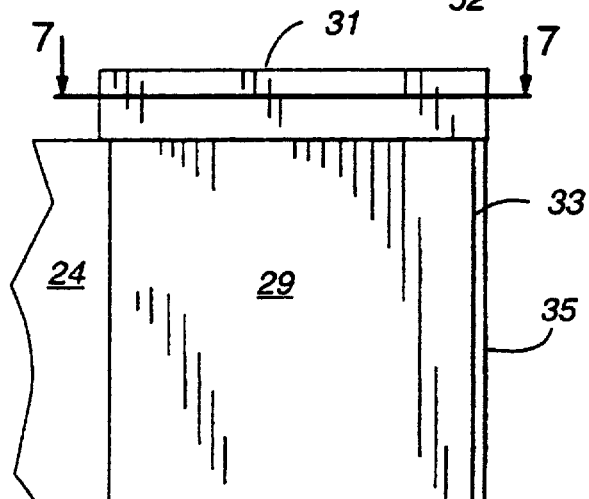
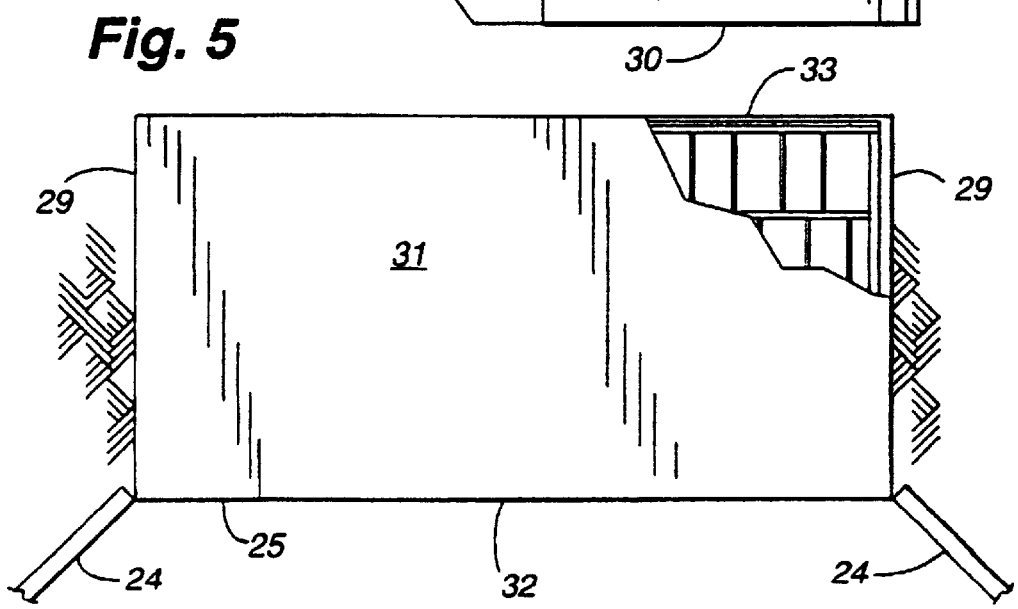

HONEYCOMB CELL STRUCTURE FOR FLUID-SOLID REACTOR

CROSS REFERENCE TO RELATED APPLICATIONS

This application claims the benefit of Provisional Application Ser. No. 60/098,407, filed Aug. 31, 1998, by Marek Henryk Zaluski, et al., for HONEYCOMB CELL FOR GROUNDWATER TREATMENT APPARATUS.

BACKGROUND OF THE INVENTION

1. Field of the Invention

The present invention relates to fluid-solid reactors. More particularly, the present invention relates to a permeable, reactive, wall element finding particular but not exclusive use in the subsurface in situ treatment of contaminated groundwater to remove contaminants therefrom.

2. Description of the Prior Art

U.S. Pat. No. 5,487,622 describes a barrier wall construction that confines and directs the underground flow of contaminated groundwater. openings or gates in the wall contain water permeable solid treatment material to remove the contaminants from the water as it flows through the gate and material. U.S. Pat. No. 5,624,552 describes a barrier wall with a gate that includes a removable basket containing the treatment material. The basket can be removed from the gate by using a crane and the treatment material replaced or rejuvenated.

OBJECTS OF THE INVENTION

It is the principal object of the present invention to provide an improved permeable solid structure containing reactive material for reaction with fluids flowing therethrough, and more particularly for reaction with contaminated groundwater to remove contaminants therefrom.

Another object of the present invention is to provide a structure of the foregoing character which facilitates the removal and regeneration, rejuvenation or replacement of the reactive solid media or material.

A further object of the present invention is to provide an in situ, underground barrier apparatus for the removal of contaminants from groundwater in which change of the reactive material is readily and easily accomplished without the use of heavy equipment such as cranes or the like.

Still a further object of the present invention is to provide an improved permeable wall that is watertight except for the permeable reactive material through which the contaminated groundwater flows.

Still another object of the present invention is to provide a permeable wall of the foregoing character in which the permeable reactive treatment material can be readily replaced or rejuvenated.

Still another object of the present invention is to provide a permeable wall of the foregoing character in which the rejuvenated or replaced reactive treatment material can be readily an easily re-inserted into the in situ barrier gate for further use.

Other objects and advantages of the present invention will become apparent as the following description proceeds, taken in conjunction with the accompanying drawings.

SUMMARY OF THE INVENTION

In one specific aspect, the present invention is embodied in a permeable wall for the in situ treatment of groundwater flowing therethrough for the purpose of removing contaminants therefrom. The water is channeled to the permeable wall by in ground barrier walls or piling. The permeable wall is formed by a frame having bottom and side walls mounted in a gate between the barrier walls. A plurality of hexagonal cells are removably placed in the frame in watertight relation to the frame and each other. Each cell is formed by a hexagonal shell of water impermeable material, defining a central chamber extending therethrough. A water permeable reagent is contained in the shell chamber for removing contaminants from groundwater flowing through the permeable wall. More particularly, each cell is formed by a regular hexagonal shell of water impermeable material, defining opposed hexagonal faces joined by a peripherally hexagonal edge. The preferred sealing structure is formed by a peripheral sealing tongue projecting from each of three adjoining faces of the hexagonal edge and sealing grooves on the other three adjoining edge faces for sealingly receiving projecting tongues on a superimposed or adjoining cell in the wall. The shell further defines a central chamber opening into the faces of the shell, and a water permeable reagent is contained in the central chamber for removing contaminants from groundwater flowing therethrough.

In its more general aspects, of the present invention is embodied in a fluid permeable solid reactor element formed of cells of reactive material capable of reaction with a fluid flowing through the cells. The permeable reactor element is formed, as described above, by a plurality of hexagonal cells supporting solid, fluid permeable, reactive material. The cells are removably contained in a frame in fluid tight relation to each other. Each cell is formed by a hexagonal shell of fluid impervious material defining a central chamber extending through the cell and containing a reactive reagent capable of reaction with the fluids flowing through the permeable element. The construction of the individual cells is as described above.

DESCRIPTION OF THE DRAWINGS

FIG. 3 is a front elevation view of the barrier gate shown in FIG. 2, with the front screen removed.

FIG. 4 is a side elevation view of the barrier gate shown in FIG. 3.

FIG. 5 is a top plan view of the barrier gate shown in FIG. 3.

DESCRIPTION OF THE PREFERRED EMBODIMENT

Figure 1:
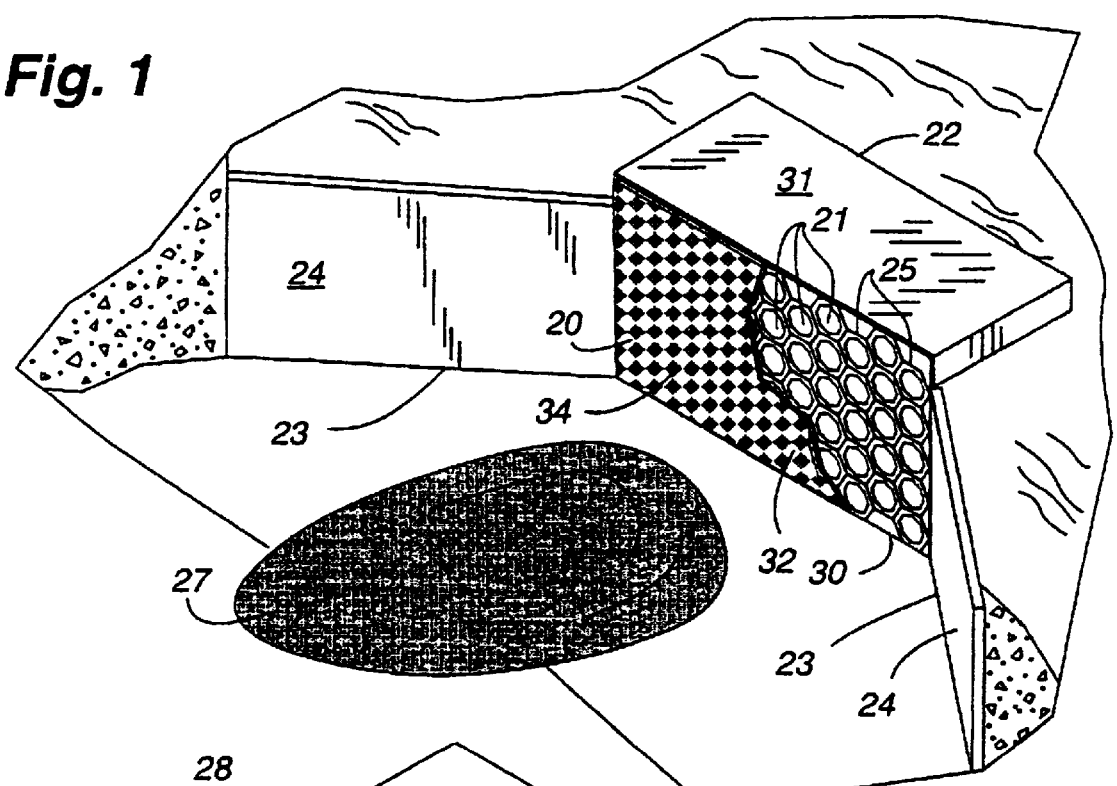
FIG. 1 is a perspective view of an in situ barrier with a gate system therein incorporating a honeycomb structure embodying the present invention containing a reactive treatment material for removing contaminants from groundwater captured by said barrier and flowing through said gate, and with a portion of the front screen broken away.
Figure 2:
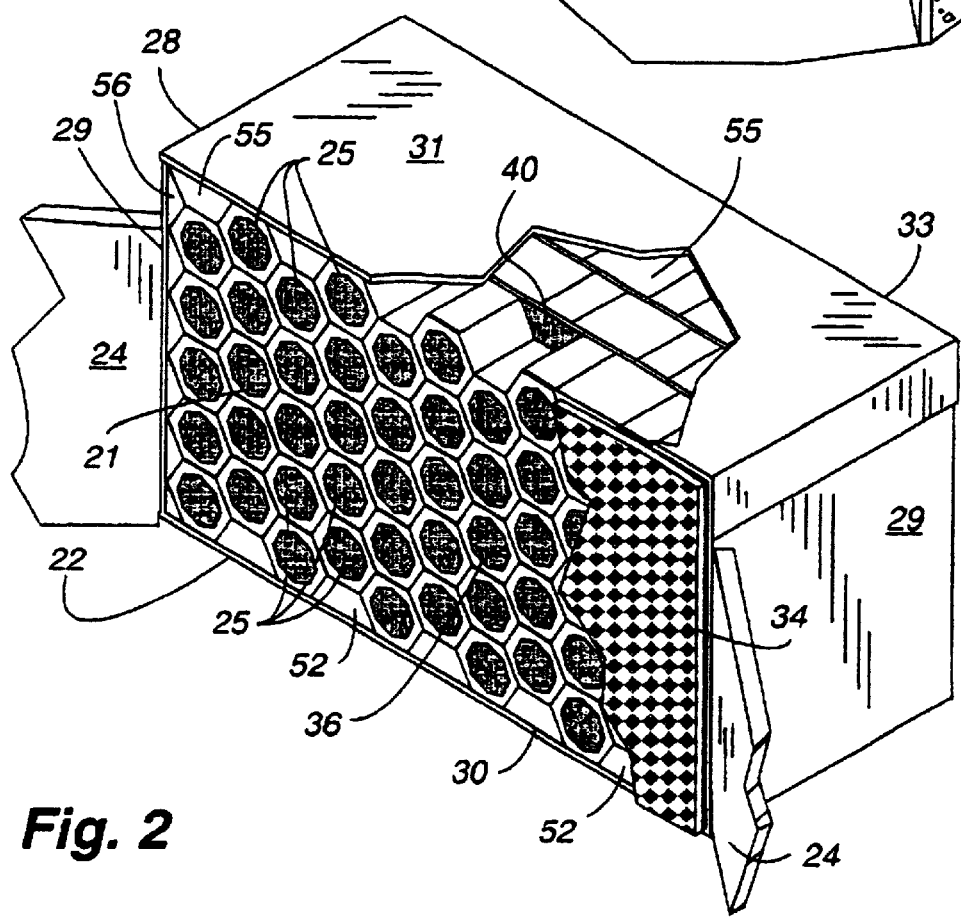
FIG. 2 is an enlarged perspective view of the barrier gate shown in FIG. 1 with a portion of the front screen removed and part of the top cover broken away to show the honeycomb cells containing the reactive treatment material.

The present invention, in one specific form as shown in FIG. 1, is embodied in a permeable wall or panel element 20 incorporating a reactive treatment material 21 and forming a gate 22 in an in situ groundwater barrier 23 formed by the gate 22 and large barrier panels or piling 24 on either side thereof. Groundwater containing dissolved and suspended contaminants, often as a plume 27, encounters the barrier 23 and is thereby forced or channeled to flow through the permeable wall or panel element 20 forming the gate 22 wherein the contaminants are removed from the groundwater by the reactive treatment material 21.

In its preferred form, the permeable wall or panel element 20 is formed by a plurality of cells 25 each containing a body of reactive treatment material and defining a honeycomb structure 26 through which the contaminated groundwater must flow. Each cell forming the honeycomb is removable and replaceable within the wall or panel element 20 so that the reactive treatment material 21 contained therein can be readily rejuvenated and returned to the gate.

To this end, the wall or panel element 20 is formed by a frame 28 having spaced vertical sidewalls 29 integrally joined by a bottom wall 30, and a top cover 31 removably spanning the sidewalls 29 parallel to the bottom wall. The frame has a height, width and depth sufficient to fill the gate 22 between the barrier panels 24 forming the in situ barrier 23. The frame 28 is formed of a corrosion resistant material such as a plastic material, for example a polycarbonate, or a corrosion resistant or coated metal, or may be formed of cast concrete, either precast or cast in place. The frame 28 is either permanently formed in place or removably attached to the walls 24 of the impermeable barrier 23.

Figure 6:
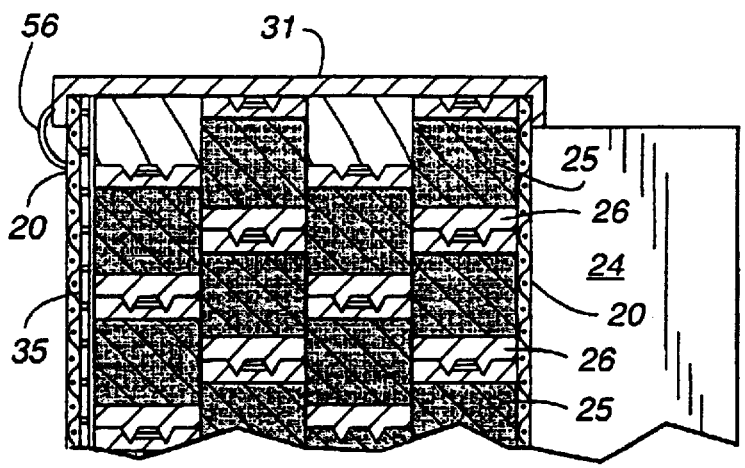
FIG. 6 is a section view taken substantially in the plane of line 6—6 on FIG. 3.
Figure 7:
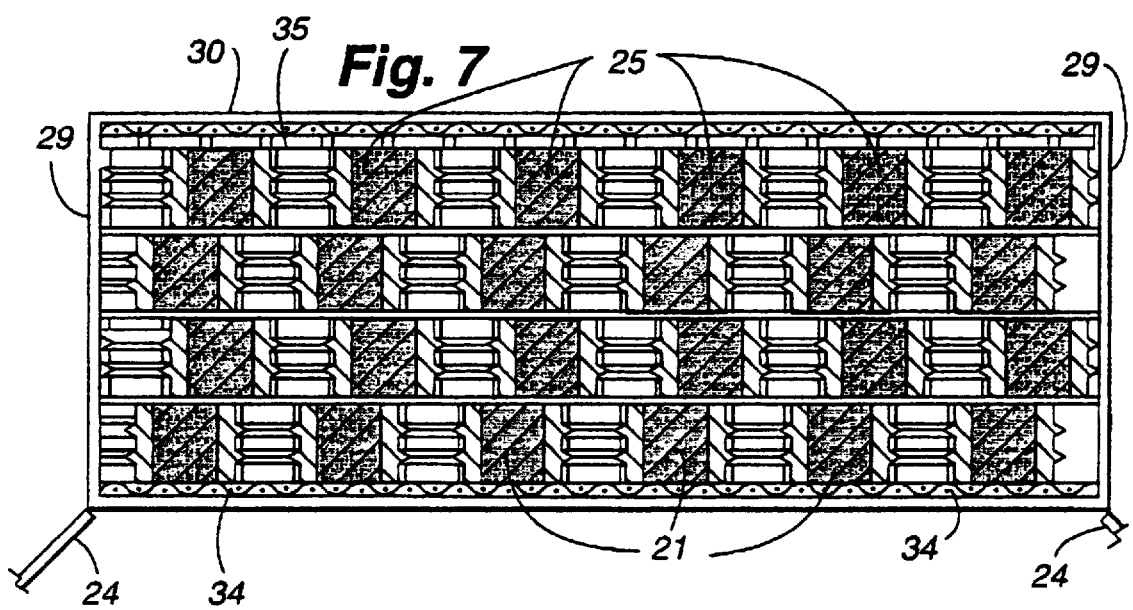
FIG. 7 is a section view taken substantially in the plane of line 7—7 on FIG. 4.

To prevent entrance into the frame 28 of aquifer matrix or pea gravel (not shown) that is placed adjacent to the frame 28 and panel element 20 to homogenize the flow of water and prevent packing of dense soil adjacent to the element 20, the front and rear faces 32,33 of the frame 28 are covered by screens or foraminous grids 34,35 secured to the frame side walls 29 and bottom wall 30 (FIGS. 6,7).

Figure 8:
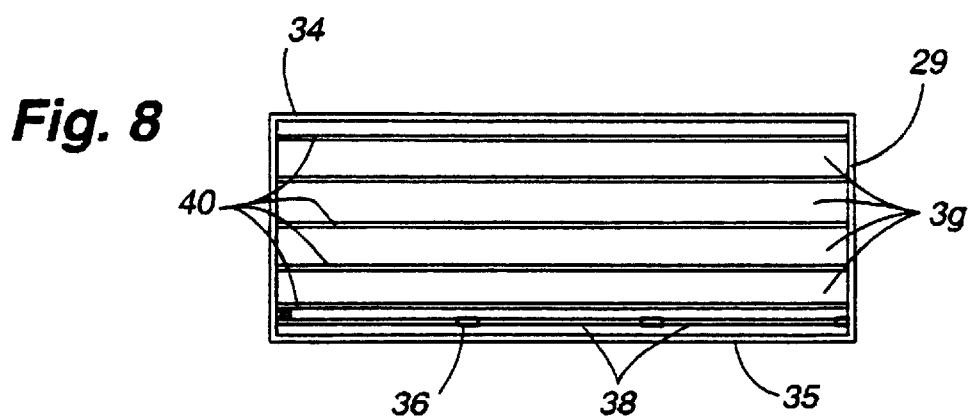
FIG. 8 is a schematic view similar to FIG. 7 but with the honeycomb forming cells removed.
Figure 9:
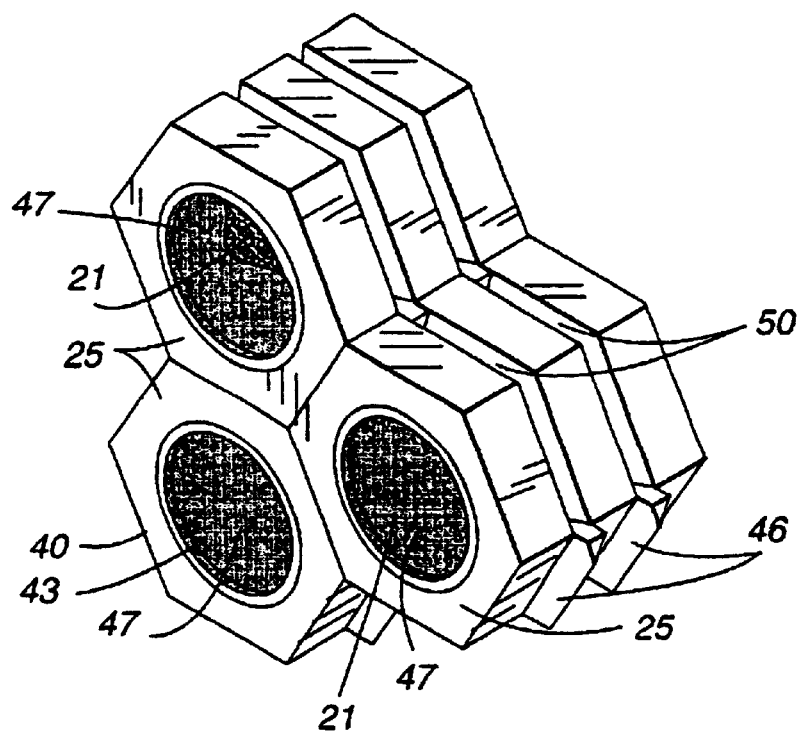
FIG. 9 is a perspective view of a honeycomb cell assembly containing reactive treatment material for use in the apparatus gate shown in FIG. 2.
Figure 10:
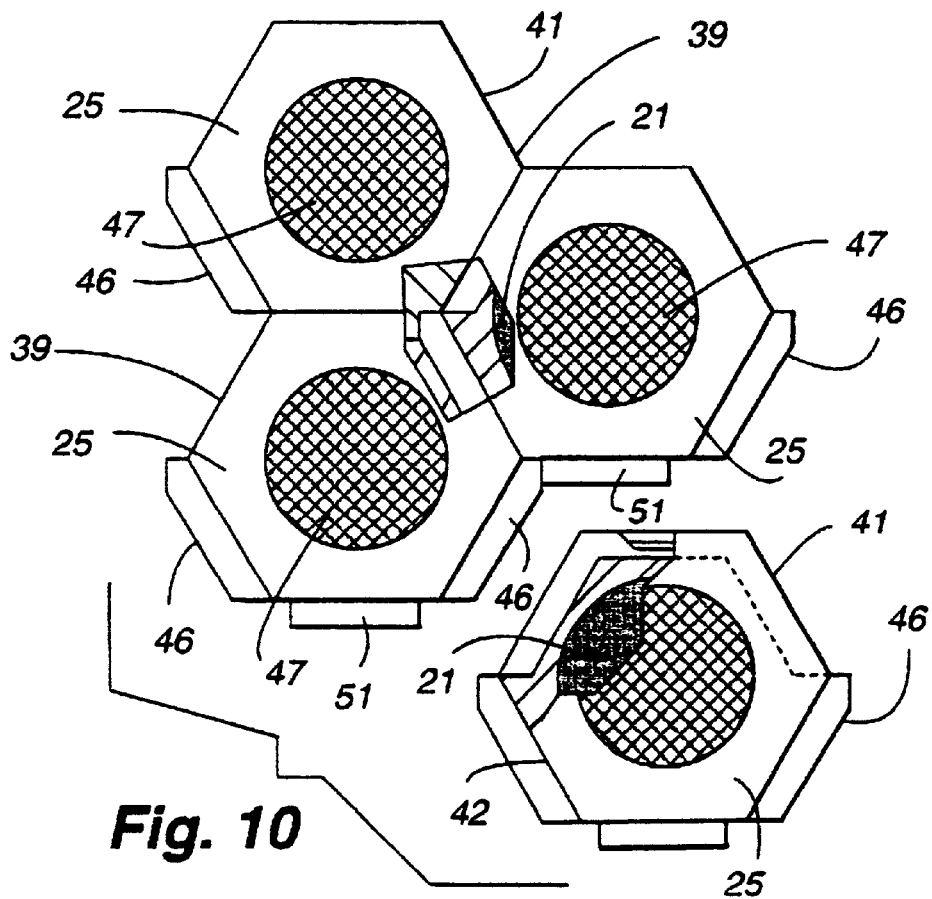
FIG. 10 is a front elevation view of a honeycomb cell assembly of the character shown in FIG. 8 with portions broken away to show the seals.
Figure 11:
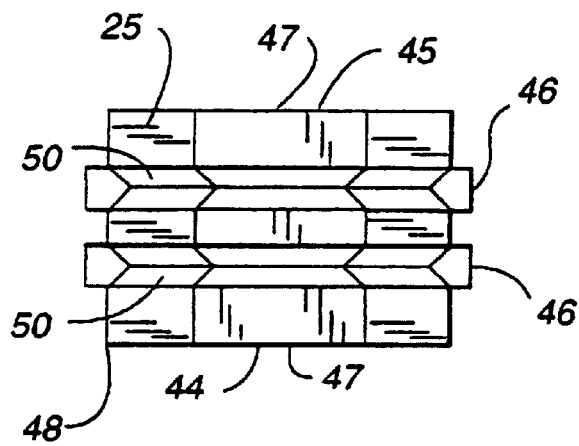
FIG. 11 is a top plan view of the honeycomb cell shown in FIG. 9.
Figure 12:
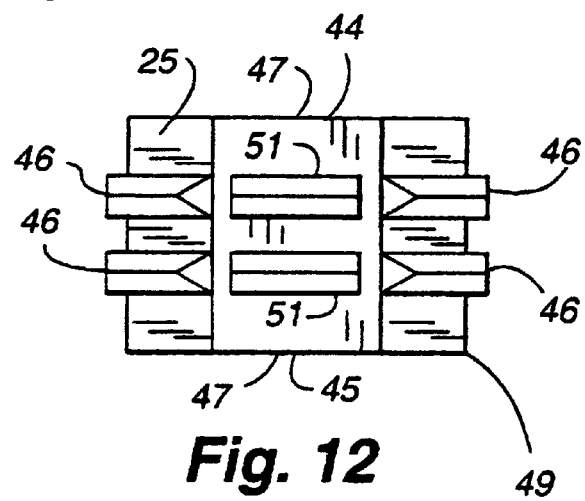
FIG. 12 is a bottom plan view of the honeycomb cell shown in FIG. 9.

Provision is made to close the frame 28 and cell element 20 of the gate against the flow of water when the honeycomb elements or cells 25 are being removed or inserted. To this end, as shown in FIG. 8, vertically extending elongated channels 36 are mounted on the rear face 33 of the frame 28 to serve as retaining guides for the insertion of one or more water impermeable membranes or panels 38. Such a sealing panel or panels 38 can be slid in and out of the channels 36 to prevent groundwater from flowing through the gate 22.

For purposes of receiving and retaining in a honeycomb configuration a multiplicity of cells 25 containing the reactive treatment material 21, the frame 28 is divided into a plurality of longitudinally and vertically extending compartments 39 by coarse grids or foraminous panels 40 spaced apart from each other and extending between the frame side walls 29 parallel to the front and rear screens or grids 34,35. Groundwater can flow through the frame 28 and compartments 39 and the permeable reactive treatment material 21 contained within the honeycomb cells 25 positioned in the compartments 39.

The honeycomb forming cells 25 are formed by a frame or body 41 having an hexagonal peripheral configuration and a width or thickness equal to the width of each frame compartment 39. Each hexagonal honeycomb cell 25 defines a peripheral hexagonal edge 42 surrounding and joining opposed faces 44, 45. Each cell further defines a central chamber 43 opening into said faces 44,45 and within which a reactive water treatment medium 21 is placed. The medium can be in the form of a plug or cylinder, or can be a loose material, either of which is retained within the chamber 43 in the hexagonal body 41 by screens or foraminous plates 47 on both faces 44, 45 thereof.

Figure 13:
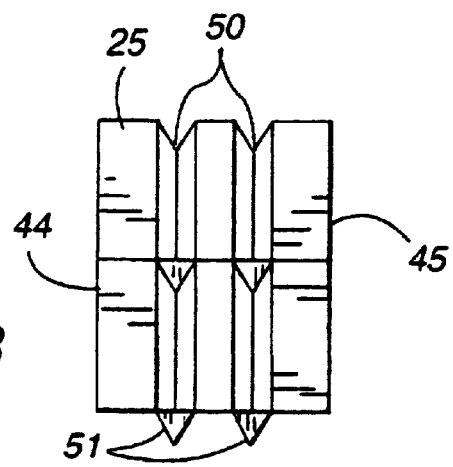
FIG. 13 is a side elevation view of the honeycomb cell shown in FIG. 9.

Contaminated groundwater is prevented from flowing between adjoining hexagonal treatment cells 25 by seals 46 on the periphery of each cell. Each cell has an upper half portion 48 and a lower half portion 49. The upper portion or upper half portion 48 of each hexagonal cell 25 defines sealing grooves 50. Elastic or flexible ribs or tongues 51 project outwardly from a corresponding lower portion or lower half portion 49 of each treatment cell 25 (FIG. 13). In order to form a seal between adjoining cells, the projecting elastic or flexible sealing tongues or ribs 51 on one cell are adapted to be inserted into and sealingly received in corresponding sealing grooves 50 in an adjacent element or cell 25. Other seals or sealing devices or means for sealing adjoining cells to each other may be utilized to advantage. In this manner, the hexagonal treatment cells 25 are tightly sealed one to the other when in use, and yet can be readily removed individually from the frame compartments 39 to permit the reactive medium 21 contained therein to be replaced, rejuvenated or reactivated.

When loading the frame compartments 39 with the hexagonal treatment cells 25, each frame compartment 39 is loaded individually. Appropriately shaped bottom blocks 52 and bottom corner blocks 53 are attached along the bottom panel or wall 30 of each frame chamber or compartment 39 and hexagonal treatment cells 25 are stacked therein in a honeycomb configuration. Additional side blocks or solid plugs 54 are positioned adjacent to the frame's side walls 29 to prevent contaminated water from leaking and escaping around the honeycomb treatment cells 25. At the top of each loaded compartment the grooves or spaces between the honeycomb elements are also filled with appropriately shaped solid plugs or blocks 55 and the top corner blocks 56, and the top cover 31 is positioned in place. The bottom blocks 52, bottom corner blocks 53, side wall blocks 54, top blocks 55, and top corner blocks 56 incorporate appropriate sealing elements which coact with the sealing elements on the cells to prevent water leakage.

When loading of the compartments 39 with the hexagonal cells 25 and filler blocks has been completed, the top cover 31 is placed over the upper ends of the frame side walls 29 and holds the cells and blocks tightly within the frame. In order to effect a complete sealing engagement between the various compartment elements, the top cover 31 is clamped to the side walls 29 by appropriate clamps 57 which secure the top cover 31 tightly on the frame 28 and holds the hexagonal cells 25 and blocks 52, 53, 54, 55, and 56, securely within the compartments 39.

When filled with treatment material containing hexagonal cells 25, each compartment 39 presents a honeycomb configuration of such cells. The honeycomb cell 25 arrangements are staggered between adjacent compartments 39 so that a straight flow path is avoided and a tortuous path is provided for the water being treated.

To facilitate removal, replacement or placement of the honeycomb cells 25, each cell 25 includes an appropriate handle (not shown), such as a rigid bar recessed in the top wall of the cell, or a flexible loop or strap, or other device, by which the cell or element may be lifted and raised or removed from a frame compartment or lowered or inserted into a frame compartment 39. The cells 25 are relatively light in weight making it a simple matter to engage the lifting device or structure with a hook or like device (not shown) either to lift a cell 25 from the frame compartment 39 or to lower a cell 25 into the frame compartment 39.

During the insertion or replacement or removal of the honeycomb material treatment cells 25 from the frame compartments 39, water entering the frame 28 is blocked by the sealing panels 38 inserted into the guide channels 36 on the back panel of the frame. Such a panel or panels 38 prevent contaminated groundwater from entering the clean aquifer down stream from the gate 22 when the honeycomb cells 25 are being inserted or removed. Water can be removed from the frame 28 and its compartments 39 by a pump (not shown) connected to a port (not shown) defined in the frame 28 to prevent contaminated water from entering the downstream flow after the treatment cells 25 are installed. During installation of the honeycomb cells 25, any excess water can be continuously removed from the frame 28 and gate 22 and circulated back to the contaminated water flow upstream of the barrier 23. When the treatment cells 25 are in place, water can be pumped until only clean water is present, and then the sealing panel or panels 38 can be removed, allowing only treated water to flow downstream.

The treatment materials may include a variety of physically, chemically or biologically active materials or media. Such reactive materials or media are well known in the art relating to the remediation of contaminated groundwater. Because the honeycomb wall with its hexagonal cell elements is easy to replace, the treatment material content of the cells can be optimized for changes of concentrations with time and composition of the contaminated plume in the groundwater. This includes replacement of chemically or biologically active materials with adsorptive media. Such features can be especially important for a plume that undergoes natural attenuation and may deliver different contaminants to the gate at various times.

While a certain illustrative embodiment of the present invention has been shown in the drawings and described above in considerable detail, it should be understood that there is no intention to limit the invention to the specific form disclosed. On the contrary the intention is to cover all modifications, alternative constructions, methods, equivalents and uses falling within the spirit and scope of the invention as expressed in the appended claims.

What is claimed is:

1. A permeable wall for the in situ treatment of groundwater flowing therethrough comprising:
    a frame;
    a plurality of hexagonal cells removably placed in said frame in watertight relation to said frame and each other;
    each said cell comprising a hexagonal shell of water impermeable material,
    said shell defining a central chamber extending therethrough; and,
    a water permeable reagent in said shell chamber for removing contaminants from groundwater flowing therethrough.

2. A permeable wall for the in situ treatment of groundwater flowing therethrough comprising:
    a frame;
    a plurality of cells removably placed in said frame in watertight relation to said frame and each other;
    each said cell comprising a hexagonal shell of water impermeable material,
    said shell defining opposed hexagonal faces joined by an edge, and further defining first and second sections each containing at least a portion of said faces and said edge;
    at least one peripheral sealing tongue projecting from an edge portion of said first section,
    an edge portion of said second section defining a sealing groove for sealingly receiving a corresponding projecting tongue on a superimposed cell;
    said shell further defining a central chamber opening into the faces of said shell; and,
    a water permeable reagent contained in said central chamber for removing contaminants from groundwater flowing therethrough.

3. A permeable wall for the in situ treatment of groundwater flowing therethrough comprising:
    a frame;
    a plurality of cells removably placed in said frame in watertight relation to said frame and each other;
    each said cell comprising a hexagonal shell of water impermeable material;
    means on said cell shell for watertight sealing engagement with adjoining cell shells;
    said shell further defining an open central chamber; and,
    a water permeable reagent contained in said central chamber for removing contaminants from groundwater flowing therethrough.

4. A permeable wall as defined in claim 3 wherein said water permeable reagent is in the form selected from the group consisting of a packed cylinder shaped to be removably received in said chamber, granular particles, and shaped packing elements.

5. A reactor for the reaction of a fluid and a solid, comprising:
    a frame;
    a plurality of hexagonal cells removably placed in said frame in fluidtight relation to said frame and each other;
    each said cell comprising a hexagonal shell of fluid impermeable material,
    said shell defining a central chamber extending therethrough; and,
    a fluid permeable solid reagent in said shell chamber for reaction with said fluid flowing therethrough.

6. A reactor as defined in claim 5 wherein said fluid is contaminated groundwater and said solid reagent is a contaminant remover.

7. A reactor for the reaction of a fluid and a solid, comprising:
    a frame;
    a plurality of cells removably placed in said frame in fluidtight relation to said frame and each other;
    each said cell comprising a hexagonal shell of fluid impermeable material,
    said shell defining opposed hexagonal faces joined by an edge, and further defining first and second sections each containing at least a portion of said faces and said edge;
    at least one peripheral sealing tongue projecting from an edge portion of said first section, an edge portion of said second section defining a sealing groove for sealingly receiving a projecting tongue on a superimposed cell;

said shell further defining a central chamber opening into the faces of said shell; and, a fluid permeable solid reagent contained in said central chamber for reacting with said fluid flowing therethrough.

8. A reactor as defined in claim 7 wherein said fluid is contaminated groundwater and said solid reagent is a contaminant remover.

9. A cell for use in a permeable wall for the in situ treatment of groundwater flowing therethrough comprising:

a vertically stackable shell of water impermeable material, said shell defining opposed vertical hexagonal faces joined by integral edges, and further defining first and second sections each containing an equal portion of said faces and said edges;

peripheral tapered flexible sealing tongues projecting from said portion of edges of said first section;

said portion of edges of said second section defining tapered sealing grooves for sealingly receiving corresponding projecting tapered tongues on like adjacent and superimposed cells;

said sealing tongues of said first section being receivable in corresponding sealing grooves in like adjacent and superimposed cells;

said shell further defining a central chamber opening into said hexagonal faces of said shell; and a water permeable reagent contained in said central chamber for removing contaminants from groundwater flowing therethrough.

10. A cell as defined in claim 9, further comprising foraminous plates covering said central chamber openings.

11. A cell as defined in claim 10, wherein at least one foraminous plate is removable.

12. A cell as defined in claim 9, further comprising screens covering said central chamber openings.

13. A cell as defined in claim 12, wherein at least one screen is removable.

14. A cell as defined in claim 9, wherein said tapered tongues and grooves provide interlocking sealing engagement with like adjacent and superimposed cells.

* * * * *